Figure 1:
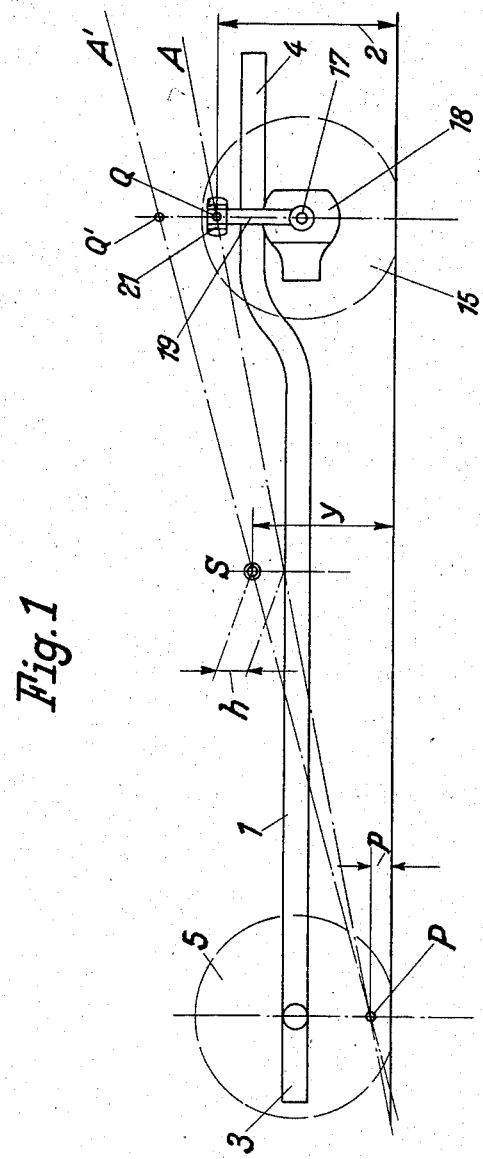

June 13, 1939.　　O. SIEBLER　　2,162,320
AUTOMOBILE
Filed Feb. 12, 1936　　2 Sheets-Sheet 1

Inventor:
O. Siebler
By: Glascock Downing & Seebold
Att's

June 13, 1939.  O. SIEBLER  2,162,320

AUTOMOBILE

Filed Feb. 12, 1936   2 Sheets-Sheet 2

Inventor:
O. Siebler

By Glascock Downing & Seebold
Attys.

Patented June 13, 1939

2,162,320

UNITED STATES PATENT OFFICE 2,162,320

AUTOMOBILE

Oskar Siebler, Zwickau, Saxony, Germany, assignor to Auto Union Aktiengesellschaft, Chemnitz, Germany Application February 12, 1936, Serial No. 63,646
In Germany February 14, 1935

2 Claims. (Cl. 280—124)

The invention relates to an automobile with independently sprung front wheels, which are guided parallel or approximately parallel.

The sprung mass of the vehicle tends, as is well known, to turn about a longitudinal axis of inclination under the influence of transverse forces, the position of which axis is determined by the manner in which the sprung mass is supported with respect to the road surface. If the front wheels are guided parallel or approximately parallel, in order to avoid difficulties in steering, the transverse force moment acting upon the front axle becomes extremely great because the axis of rotation determined by the parallel guiding system lies in or near to the road surface. When travelling round a curve the front end of the vehicle will therefore take on an outward inclination so that there will be a feeling of lack of safety and an undue stressing in the springing and supporting arrangement of the vehicle.

These disadvantages are avoided by the invention by the fact that the longitudinal axis of inclination rises rearwardly at an angle to the road surface in such a manner that when travelling round a curve the transverse force moment acting upon the rear axle is in the opposite direction to that acting upon the front axle. The missing transverse stability of the vehicle at the front axle is in this case compensated by the increased stability at the rear axle since the transverse force moment applied to the front axle and directed towards the outer side of the curve is wholly or partially compensated by the transverse force moment applied to the rear axle and directed towards the inner side of the curve. In this manner the centrifugal force acting at the centre of gravity of the sprung mass can produce little or no swinging moment about the longitudinal axis of inclination of the vehicle, whereby the springing and supporting arrangements of the vehicle are relieved and the vehicle lies safely in the curve, even at high speeds.

A preferred construction of the invention consists in this, that the bearings for the leaf springs intended for supporting the rigid rear axle are arranged above the centre of gravity of the sprung masses of the vehicle. Such springing arrangements have already been proposed with the object of allowing the sprung masses to swing towards the inner side of a curve when travelling round a curve in order to increase the feeling of safety for the passengers. In this case however, the springing and supporting arrangements of the vehicle are still greatly stressed and the transverse stability of the vehicle is not fundamentally improved.

The arrangement according to the invention is illustrated by way of example in the accompanying drawings.

Figure 2:
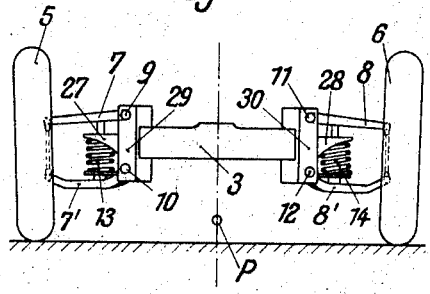
Figure 3:
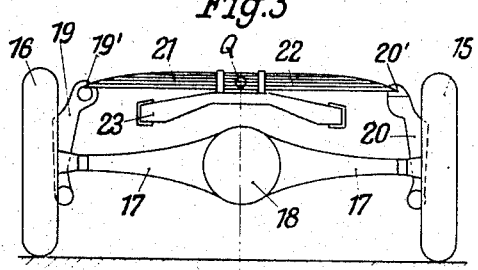
Figure 4:
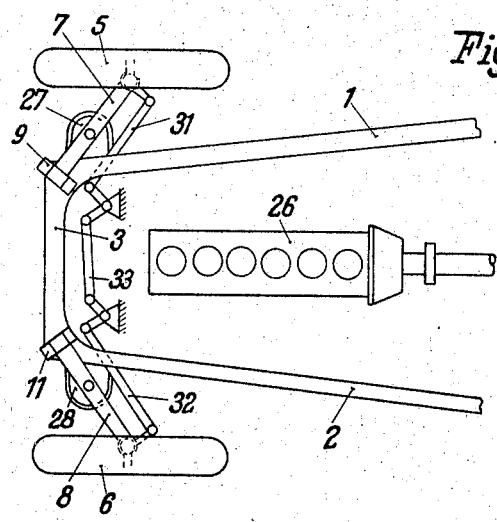
Figure 5:
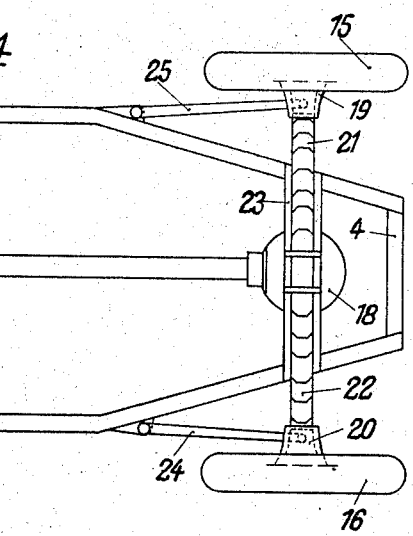
Figure 5:
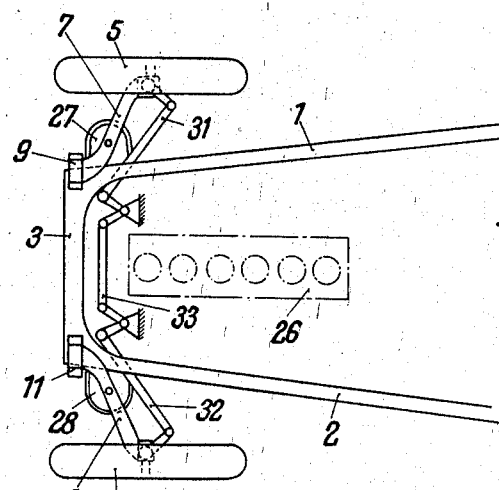

Fig. 1 is a side elevation of the vehicle frame,
Fig. 2 is a corresponding front elevation,
Fig. 3 is a corresponding rear elevation,
Fig. 4 is the corresponding plan view, and
Fig. 5 is a plan of the vehicle frame in a modified construction.

The frame consists of two longitudinal members 1, 2 which lie in a plane with the front axle and are connected together by the transverse member 3, but which are curved upwards at the rear axle and connected together by the transverse members 4, 23. The front wheels 5, 6 are guided parallel to one another by swinging supporting member 7, 7' and 8, 8' forming in each case a jointed parallelogram and are sprung with respect to the frame by means of helical springs 13, 14. The supporting members 7, 7' and 8, 8' are mounted on the front end of the frame by the journals 9, 10 and 11, 12, and are inclined rearwardly in such a manner that they can swing up and down in planes at an angle to the central longitudinal plane of the vehicle. The helical springs 13, 14 are arranged between the lower supporting members 7', 8' and the abutments 27, 28 which are preferably connected with the journal bearings 29, 30, are compressed when the front wheels 5, 6 swing. The front wheels 5, 6 are steered in a known manner by means of divided gauge rods 31, 32 which are pivotally connected together by means of a transverse rod 33. The rear wheels 15, 16 are mounted on a rigid axle 17, in the centre of which is the differential gear 18. The differential gear 18 is flexibly connected with the engine 26 at the front of the vehicle through a Cardan shaft. With the rear axle 17 are rigidly connected upwardly projecting supporting members 19, 20 on which are mounted the ends 19', 20' of a transverse leaf spring 21. The stretched leaf spring 21 is rigidly connected with the transverse member 23 by means of clips 22 above the raised ends of the frame. The rear axle 17 is additionally guided with respect to the frame members 1, 2 by means of struts 24, 25 which take up the thrust.

In Fig. 1 P is the front pivot point determined by the parallel guiding of the front wheels 5, 6 and Q is the rear pivot point determined by the elevated supporting means of the rear axle 17. The points P, Q determine the longitudinal axis of inclination A of the sprung mass which rises towards the rear. The point $p$, on account of the suspended supporting member 7, 7' and 8, 8' lies above the road surface at a distance $p$ which is smaller than the distance of the centre of gravity $y$, while the rear point $q$ lies above the road surface $q$ greater than the distance $y$ on account of the elevated supporting members 19, 20. When travelling round a curve a centrifugal force moment is applied to the front axle acting at a distance $y—p$ and directed towards the outer side of the surface $f$, and at the same time there is applied to the rear axle a centrifugal force moment acting at a distance $q—y$ and directed towards the inner side of the curve. If the centre of gravity S, as shown in the drawings, lies a distance $h$ above the axis of inclination A, the rear transverse force moment cannot compensate the front transverse force moment alone and the vehicle tends to become inclined towards the outside of the curve. This movement is opposed by the frictional moment of the springing and supporting means which arises from the bearing friction of the supporting members 7, 7' and 8, 8' as well as the spring supporting members 19, 20. The sprung mass of the vehicle will thus remain at rest provided the distance $h$ is sufficiently small, if the moment of the transverse force at the front axle is in equilibrium to the moments of the transverse force at the rear axle and the total friction in the springing and supporting means. If the transverse leaf spring 21 is placed at a still higher level, which is possible by increasing the length of the supporting members 19, 20, the result may be obtained that the pivot point at the rear axle falls at Q' and the axis of inclination of the sprung mass becomes a line A' through the centre of gravity. In this case the transverse force moment acting on the front axle is exactly equal and opposite to that acting upon the rear axle, so that even if the springing and supporting means were free from friction the vehicle would still have no tendency to become inclined when travelling round a curve. The point P at the front axle can only be placed at a higher level when the wheels are guided parallel if the transverse swinging link members forming a quadrilateral hang downwards with respect to the road surface. In this simple way it becomes possible to increase the distance $p$ within practical limits determined by the permissible alteration in gauge of the front wheels and, assuming an equal distance $h$, to diminish the lengths of the supporting members 19, 20.

The arrangement shown in Fig. 4 differs from that described above only in that the journals 9, 10 and 11, 12 of the supporting members 7, 7' and 8, 8' which are mounted at the front end of the frame, are arranged transversely so that the front wheels 5, 6 can swing up and down in planes parallel to the longitudinal central plane. The engine 26 is placed further forwards nearer to the transverse frame member 3 so that it lies above the front axle. It is clear that the rearwardly extending supporting members 7, 7' and 8, 8' not only diminish the liability to shocks to the front wheel guiding but also make it possible to increase the useful length of the vehicle.

It is immaterial for the invention how the parallel guiding of the front wheels is obtained. The supporting member of the jointed quadrilateral may also consist of a spring, for example transverse leaf springs. Instead of the jointed parallelograms it is possible to use independent guides, for example link members swinging in the direction of travel, or vertical sleeves. The rear wheel need not be mounted on a rigid axle. They may also be independently guided as long as the swinging and supporting means allow of an arrangement of the pivot point above the centre of gravity. The invention lies in the idea of compensating the tendency of the vehicle to tilt above the front axle due to the parallel guiding by means of an oppositely directed tendency to tilt over the rear axle and of combining in this way complete reliability of steering with complete safety on curves.

What I claim is:

1. In a motor vehicle, a chassis frame, front steering axles, front steering wheels mounted on said axles, spring means operatively connecting said axles to the frame and adapted to guide the wheels substantially parallel, rear wheels, a rigid rear axle on which the rear wheels are mounted, supporting means carried by the rear axle, leaf springs arranged above the level of the center of gravity of the vehicle and carried by said supporting means, the rear portion of the frame being supported by said leaf springs, the parts being so positioned that a longitudinal axis of inclination rising obliquely from the front to the rear with respect to the road surface rises above the level of the center of gravity of the sprung mass, whereby oppositely directed transverse force moments which act on the axles when the vehicle is traveling around a curve, are exactly equal so as to eliminate moments of inclination of the sprung mass.

2. In a motor vehicle, a chassis frame having its rear end arranged at a higher elevation than its front end portion, means including links pivotally connected to the front end portion of the frame for movement about horizontal axes, front steering axles operatively connected to the links, springs operatively connecting the links and frame to resist upward movements of the links, front wheels mounted on said axles, a rigid rear axle extending beneath the rear portion of the frame, rear wheels mounted on the rear axle, supporting means mounted on the rear axle, transverse leaf springs carried by said supporting means and positioned above the center of gravity of the chassis, and means connecting the medial portion of the leaf springs to the rear end portion of the frame for supporting the latter.

OSKAR SIEBLER.